United States Patent
Schütt et al.

(10) Patent No.: US 6,520,560 B2
(45) Date of Patent: Feb. 18, 2003

(54) LATCHING DEVICE FOR A FOLDING ROOF

(75) Inventors: Thomas Schütt, Fürstenfeldbruck (DE); Sven Asendorf, Herrsching (DE); Marco Lauterbach, Kasendorf (DE)

(73) Assignee: Webasto Vehicle Systems International GmbH, Stockdorf (DE)

(*) Notice: Subject to any disclaimer, the term of this patent is extended or adjusted under 35 U.S.C. 154(b) by 88 days.

(21) Appl. No.: 09/750,787

(22) Filed: Jan. 2, 2001

(65) Prior Publication Data

US 2002/0021021 A1 Feb. 21, 2002

(30) Foreign Application Priority Data

Jan. 1, 2000 (DE) .......................... 100 00 002

(51) Int. Cl.⁷ .................................. B60J 7/12
(52) U.S. Cl. ............. 296/121; 296/107.09; 292/DIG. 5
(58) Field of Search ................. 296/121, 117, 296/107.09; 292/DIG. 5

(56) References Cited

U.S. PATENT DOCUMENTS

| | | |
|---|---|---|
| 5,154,479 A | 10/1992 | Sautter, Jr. |
| 5,269,586 A | 12/1993 | Hahn et al. |
| 5,284,378 A | 2/1994 | Sautter, Jr. |
| 5,413,390 A * | 5/1995 | Filippi ................... 296/121 X |
| 5,839,778 A | 11/1998 | Schaible et al. |
| 6,042,174 A * | 3/2000 | Durrani ....................... 296/121 |
| 6,158,786 A * | 12/2000 | Droste et al. .......... 292/DIG. 5 |

FOREIGN PATENT DOCUMENTS

| | | |
|---|---|---|
| DE | 297 03 774 | 11/1997 |
| DE | 296 22 540 | 6/1998 |
| DE | 197 08 482 | 7/1998 |
| EP | 0 492 006 | 7/1992 |
| WO | 92/15466 | 9/1992 |
| WO | 96/27509 | 9/1996 |

* cited by examiner

Primary Examiner—Joseph D. Pape
(74) Attorney, Agent, or Firm—Nixon Peabody LLP; David S. Safran (57) ABSTRACT

A latching device for latching a folding roof (1) of a motor vehicle on a windshield apron (3) which has a movably supported latch hook (5) which can be latched by a drive in locking engagement on a counterpiece of the lock. The latch hook (5) is movably supported either on the free end (2) of the folding roof (1) or on the apron (3) and it can be latched on the apron (3) or the roof free end (2) as a lock counterpiece, and the drive moves an intermediate element, such as a pivot lever (14) which is coupled to the latch hook (5), for closing and latching the folding roof (1) in a pivoting and sliding motion relative to the stationary guide part (7) which is in guided engagement in a guideway (8) of the latch hook (5) and pivots around the guide part (7).

22 Claims, 14 Drawing Sheets

LATCHING DEVICE FOR A FOLDING ROOF

BACKGROUND OF THE INVENTION

1. Field of the Invention

The invention relates to a latching device for a folding roof of a motor vehicle with a latch hook which is movably supported on the free end of the folding roof and which can be latched by a drive means in lock engagement on the airscoop of the motor vehicle. Furthermore, the invention also relates to a latching device for latching the folding roof of a motor vehicle on an airscoop which has a movably supported latch hook which can be latched by a drive means in lock engagement on the counterpiece of the lock.

2. Description of Related Art

German Utility Model DE 297 03 774 U1 discloses a closing device for a convertible folding roof which has a lock hook which is supported on the roof free end of a convertible to be able to pivot around the transverse axis of the motor vehicle and which can be swung by means of a four-bar mechanism which is actuated via a handle into its locked position in which it keeps the roof free end of the convertible folding roof on the apron closed and latched.

Published International Application WO 92/15466 (published European Application EP 0 536 354 and corresponding U.S. Pat. No. 5,154,479) discloses a latching device for a folding roof which has a lock hook which is pivotally mounted on a bearing lever. The bearing lever is pivotally mounted on the bearing plate of the free end of the folding roof and can be moved by a motor via a drive part. The bearing plate has a guide surface against which the lock hook is tensioned by means of a spring. By means of the movable drive part the lock hook is moved into the engagement and locking position on an abutment on the apron by means of the bearing plate and the guide surface out of its disengaged position.

Published European Patent Application EP 0 492 006 A1 and corresponding U.S. Pat. No. 5,269,586, discloses a device for lowering and holding the free end of a motor vehicle folding roof. A lowering and latch hook is movably supported on the frame on the bottom of the apron for engaging the abutment on the roof free end. The lowering hook has an elongated guide slot through which a frame-mounted guide journal extends. On the back end of the lowering hook, a pivot pin is attached which is guided in the receiving slot of the frame and which can be moved by a drive means. The driven pivot pin which is moved in the receiving slot pivots the lowering hook around the frame-mounted guide journal while at the same time the lowering hook is pushed relative to the guide journal.

SUMMARY OF THE INVENTION

The primary object of the present invention is to devise a latching device as described initially which, with a simple structure, ensures reliable lowering of the free end of the roof on the last path of motion to the apron and the latching thereto.

This object is achieved in a first latching device in accordance with the invention in that the latch hook for closing and latching the folding top can be moved in a pivoting and sliding motion relative to the guide part of the roof free end which is guided into engagement with the guideway of the latch hook, and can be pivoted around the guide part. Relative to a circular-arc shaped pivoting motion around a fixed axis of rotation, by means of the additional displacement of the latch hook relative to the roof free end the desired dynamic behavior can be set, in which the roof free end traverses different paths in the lengthwise direction of the motor vehicle and in the vertical direction (x-direction and z-direction) on the last path of motion upon approaching the apron and when closing and latching the folding roof on the apron. Thus, the high tension forces which are necessary to close the folding roof and which are necessary on the last path of motion to tension the roof cover and to press the roof free end against a seal can be provided by a transfer of motion from a comparatively weak drive motor or the like and also during manual actuation. In order to guide the roof free end reliably to the apron in the last path of motion, the latch hook can be made elongated and can be moved over a correspondingly large displacement path in the respective displacement direction. The latch hook is then preferably located on the roof free end in a pivot plane which is aligned especially roughly in the vertical lengthwise plane of the motor vehicle.

Preferably, the drive means moves an intermediate element and especially a pivot lever which is coupled to the latch hook and moves it for closing and latching the folding roof in a pivoting and sliding motion relative to the stationary guide part which engages by guidance the guideway of the latch hook as, for example, a guide, and pivots around the guide part. By means of the intermediate element or the pivot lever, advantageously, a certain dynamic behavior of the latch hook can be fixed and adjusted in addition to the dynamic behavior which is provided by the drive means. The pivot lever is feasibly supported parallel to the latch hook, and the support can be a pivot axle with an arrangement relative to the guide part of the latch hook which determines the dynamic behavior. The pivot lever furthermore enables the actuation speed and the actuation path of the drive means to be easily reduced or raised. The guideway of the latch hook is feasibly an elongated recess in the form of a guide slot for the pin or for the roller which is being supported on the pin.

The object is also achieved in that, in a second latching device according to the invention, the latch hook is movably supported either on the free end of the folding roof or on the apron and can be latched on the apron or the roof free end as a lock counterpiece, and in that the drive means moves an intermediate element, and especially a pivot lever, which is coupled to the latch hook, and to close and latch the folding roof, moves the hook in a sliding and pivoting motion relative to the stationary guide part which is guided into engagement with the guideway of the latch hook and pivots the guide part. The latch hook, and thus also the drive means, can accordingly be housed both on the apron and also on the roof free end corresponding to the available space requirement. The interposed intermediate element or the pivot lever offers the aforementioned advantages.

One preferred embodiment calls for the latch hook to be coupled to the drive means via a latching mechanism which contains the pivot lever which is pivotally mounted on the roof free end or on the apron and which is connected to the latch hook via a coupling element which is spaced apart from the guideway, for example, a pin, and for the latching mechanism to slowly move the latch hook in the last section of movement before its latching position on the apron at an increased drive force.

Feasibly, the coupling element and the pin are guided by the pivot lever on a curved path, especially on a section of a curved path. The curved path determines the respective distance from the pin to the stationary guide part or the guide slot of the latch hook. A curved path in the form of an orbit is formed when the pivot lever is supported to be able to pivot around a fixed pivot axis. When the pivot axis is located adjacent to the stationary guide part, with the corresponding direction of motion, the desired increasing distance results between the pin and the guide part which causes displacement of the latch hook in the desired manner.

Preferably, the drive means contains a drive journal which is coupled to the pivot lever and drives it in two opposite directions for latching or unlatching, the drive journal, on an essentially linear path which is spaced from the pivot axis or the bearing pin of the pivot lever, being moved past the pivot axis or the bearing pin and being movably held in the guideway of the pivot lever to equalize the changing distance to the pivot axis in drive engagement. However, the drive means can also drive the drive journal on a nonlinear path which is laid out according to the required dynamic behavior.

For reliable closing of the folding roof, especially for motion into the seal, it is a good idea if the drive journal is moved slowly by the drive means against the latching position of the latch hook. The slowed motion can be achieved, for example, by a variable speed of the drive motor. One preferred embodiment, however, calls for the drive means to have a drive rod which is located on the free end of roof or the apron in the transverse direction and which has a drive journal on its outer end which fits into the latching mechanism and is pivotally mounted on the opposite, inner end so that the drive journal is guided on a roughly linear path of motion when the drive rod is pivoted, and a guide element which intersects the drive rod at an acute angle and which is securely mounted on the roof free end, or on the apron, in the transverse direction and on which there is movably supported a guide block which can be driven by a drive unit and which fits into a lengthwise guide of the drive rod by sliding at the intersection point, and by means of its lengthwise displacement on the guide element, pivots the drive rod with the drive journal. By means of this simple mechanical mechanism, the dynamic behavior of the drive journal can be adjusted without special rpm control of, for example, an electric drive motor used for that purpose. Thus, the guide block which is driven with a roughly constant speed, accelerates or slows down the journal depending on its direction of motion.

If the guideway or the guide slot in the latch hook has at least one nonlinear path section, superimposed on the motion of the intermediate lever or the pivot lever, the motion of the latch hook can also be adjusted.

Preferably, the latch hook in the latch mechanism is movably supported in a symmetrical arrangement between two holding plates and two pivot levers. Thus, the latch hook is accommodated, for example, between two holding plates which are mounted on the roof free end and is moved by two pivot levers which are each pivotally mounted on the holding plate.

Feasibly, the drive means comprises an electric motor which drives an actuating cable which is connected to the guide block via a pinion. However, hydraulic drives can also be used. Alternatively, the propulsion means can be a handle, a turning handle, which is connected to the guide block via a raising cable to move it. Two latching mechanisms which are spaced apart as well as only one latching mechanism can be actuated by the central arrangement of the drive means.

In one alternative preferred embodiment, the drive means is formed as a pivoting handle for each latching mechanism which is coupled to the journal in a drive connection. The handle can be latched in the closed position by a safety device against unwanted opening.

In the following, preferred embodiments of the latching device are explained in detail with reference to the accompanying drawings.

DETAILED DESCRIPTION OF THE PREFERRED EMBODIMENT

A folding roof 1 of a convertible has a free end 2 (see FIG. 1) which, for example, has a front bow which joins the two front side lengthwise rods of the roof rod assembly. With the roof 1 closed (see FIG. 3), the roof free end 2 is lowered onto a cross member or windshield header or apron 3 at the top edge of a front windshield, the seal 4 of the roof free end 2 adjoining the apron 3. In the right and in the left side area of the roof free end 2, there is a latching mechanism 35 which has a latch hook 5 (see FIG. 4). Each latching mechanism 35 is driven via a motor-actuated drive means 16 which is located in the roof free end 2 between the two latching mechanisms 35. Since the right and left latching mechanisms 35 have an identical structure, the latching device is described simply using the illustrated left latching mechanism 35.

The latch hook 5 is located between two parallel holding plates 6, 6' which are spaced apart (see FIG. 4) and which are attached to the roof free end 2 and are connected to one another via a pin 7 which constitutes a guide part or element. The pin 7 extends through the guideway 8 of the latch hook 5 which is formed as an elongated recess in the latch hook 5. A roller 9 supported on the pin 7 is held without play or almost without play in the guideway 8 so that the latch hook 5 can move along the length of the guideway 8 relative to the roller 9 or the pin 7 and can be pivoted relative to the pin 7.

Figure 4:
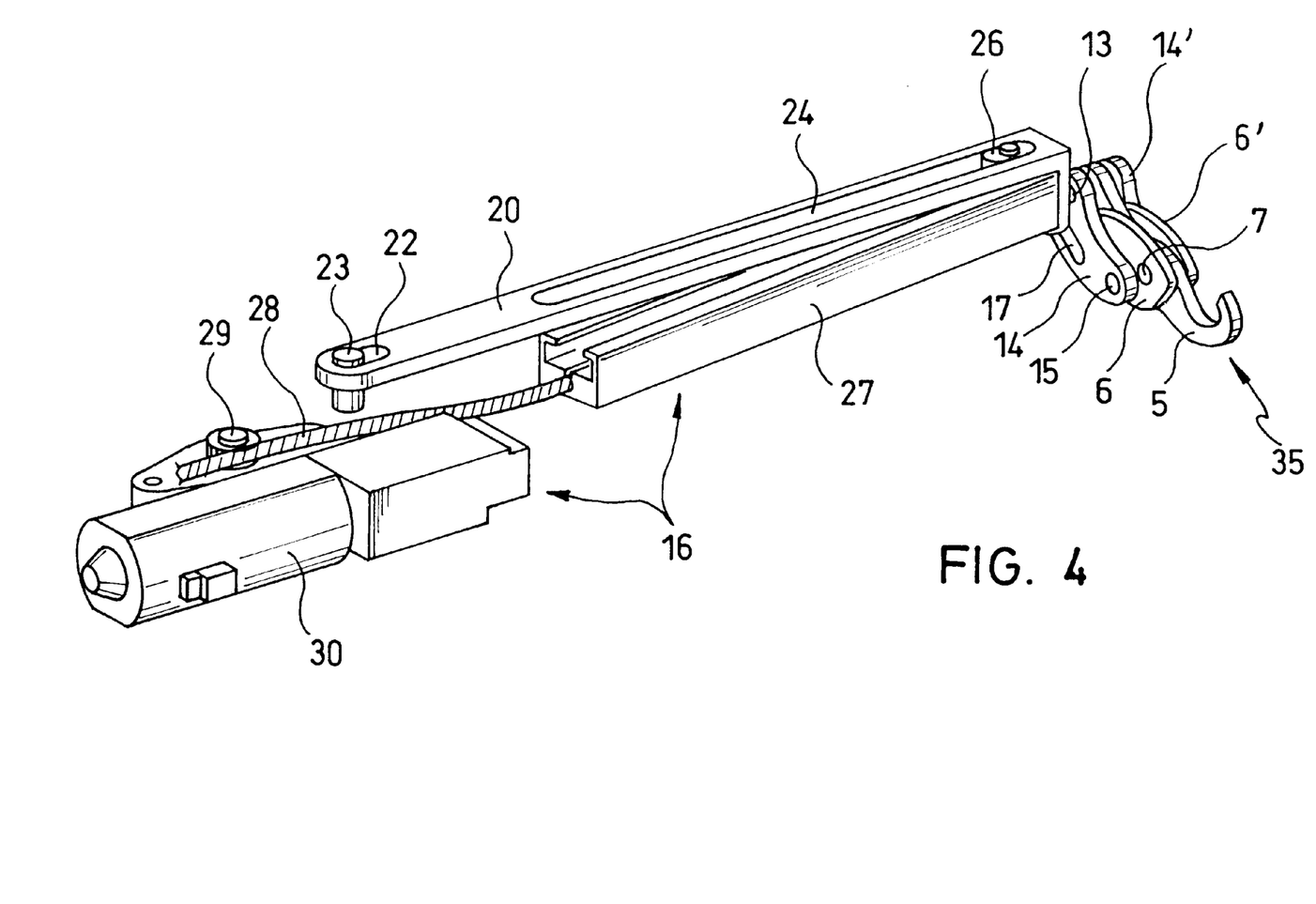
FIG. 4 is a perspective view of the latch hook with its latching mechanism and a drive means.

The latch hook 5 has a front hook-shaped end 10 for reaching around the lock journal 11 of the apron 3 which serves as a lock counterpiece. The back end 12 of the latch hook 5 is penetrated by a pin 13 which, serves as a coupling element, securely joins two plate-like pivot levers 14, 14' to one another. The pivot levers 14, 14' are intermediate elements located next to the outer side of the respective holding plate 6, 6' and are pivotally mounted on a bearing pin 15 which is attached in the respective holding plate 6, 6' (FIG. 4).

The inner pivot lever 14, which is adjacent to the drive means 16, contains a guide 17 into which the journal 18 of the drive means 16 fits. The journal 18 projects on the outside end face 19 of the drive rod 20 of the drive means 16 which is mounted on the roof free end 2 in a transverse alignment. The end 21 of drive rod 20 that faces away from the latch hook 5 contains a short elongated hole 22 into which the roof-mounted guide pin 23 fits. The drive rod 20 contains a guide 24 which is formed by an elongated slot which extends from the opposite end 25 of the drive rod 20 in the direction to the short elongated hole 22. The journal of a guide block 26 fits into the guide 24 and is movably supported on a rail-like guide profile 27 which is upwardly open and is connected via a sheet metal clip to the raising cable 28 which is guided through a guide tube and is connected to a drive pinion 29 of the electric motor 30 for driving the guide block 26.

Figure 5:
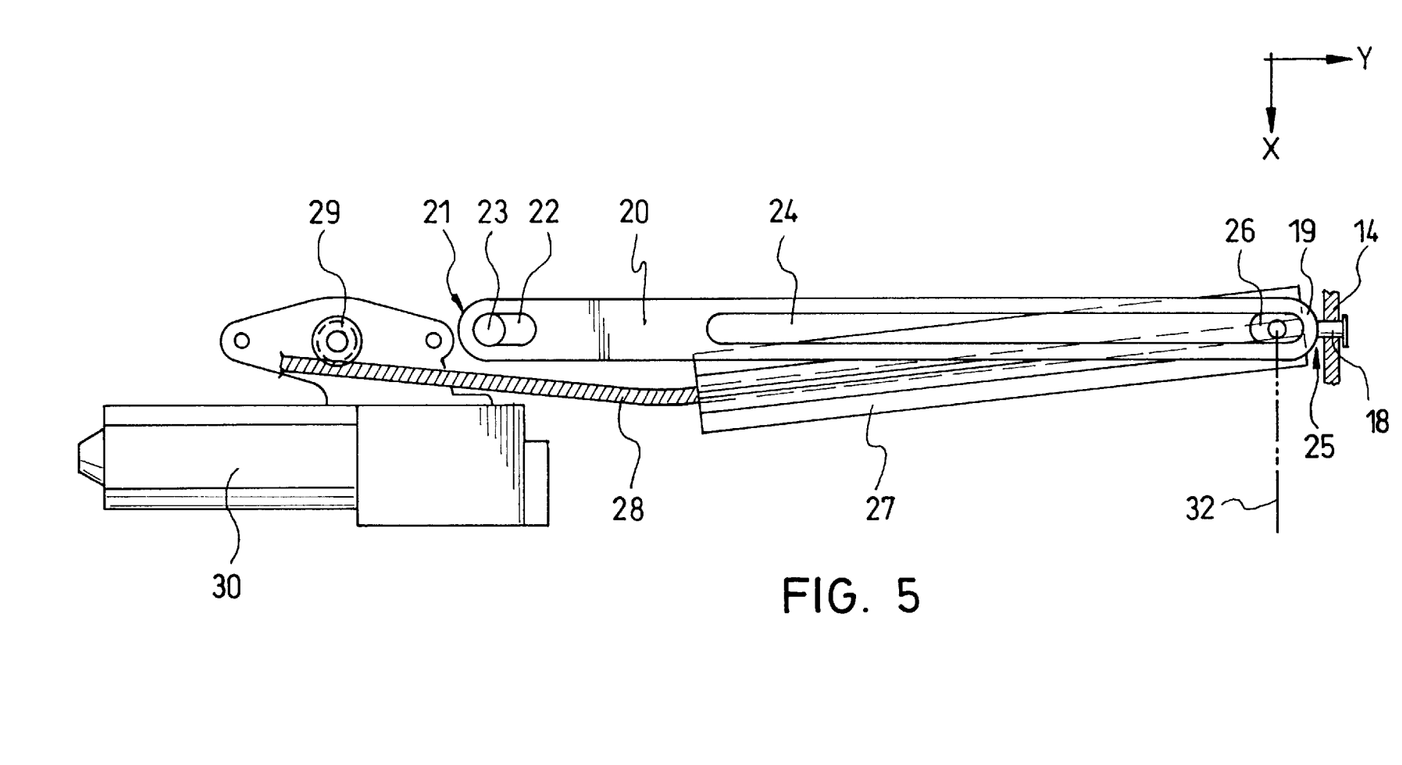
FIGS. 5 & 5a are top views the drive means for the arrangements of FIGS. 2 & 2a, respectively.
Figure 5A:
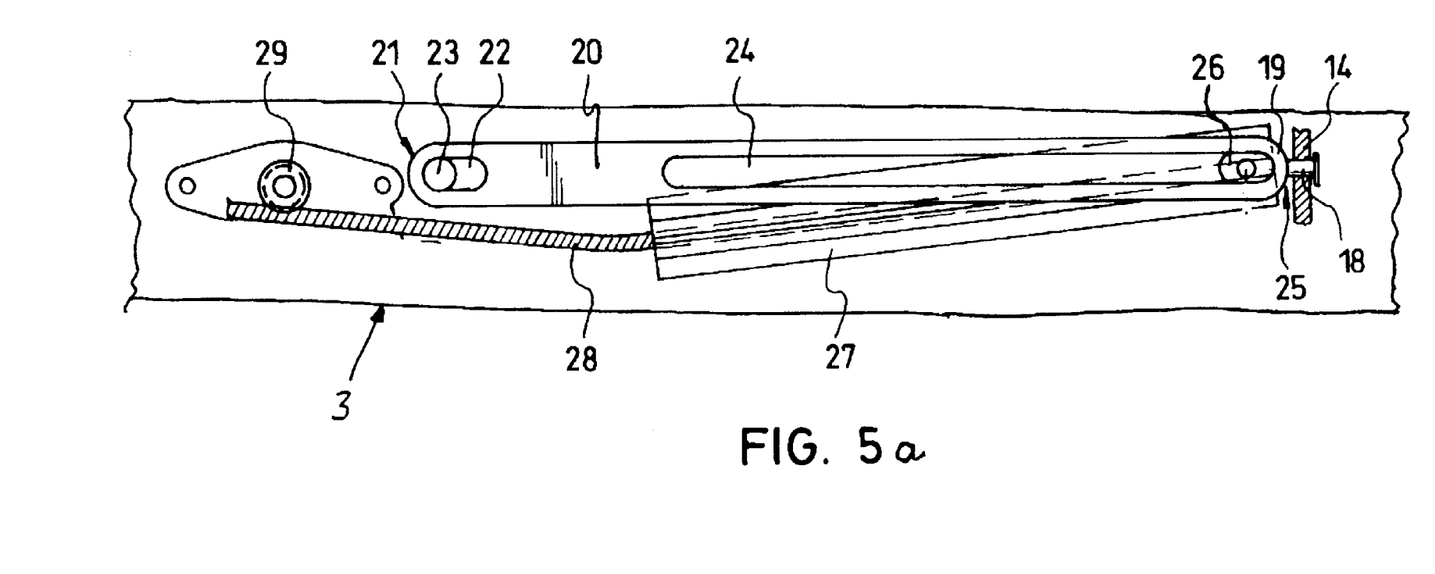
Figure 6:
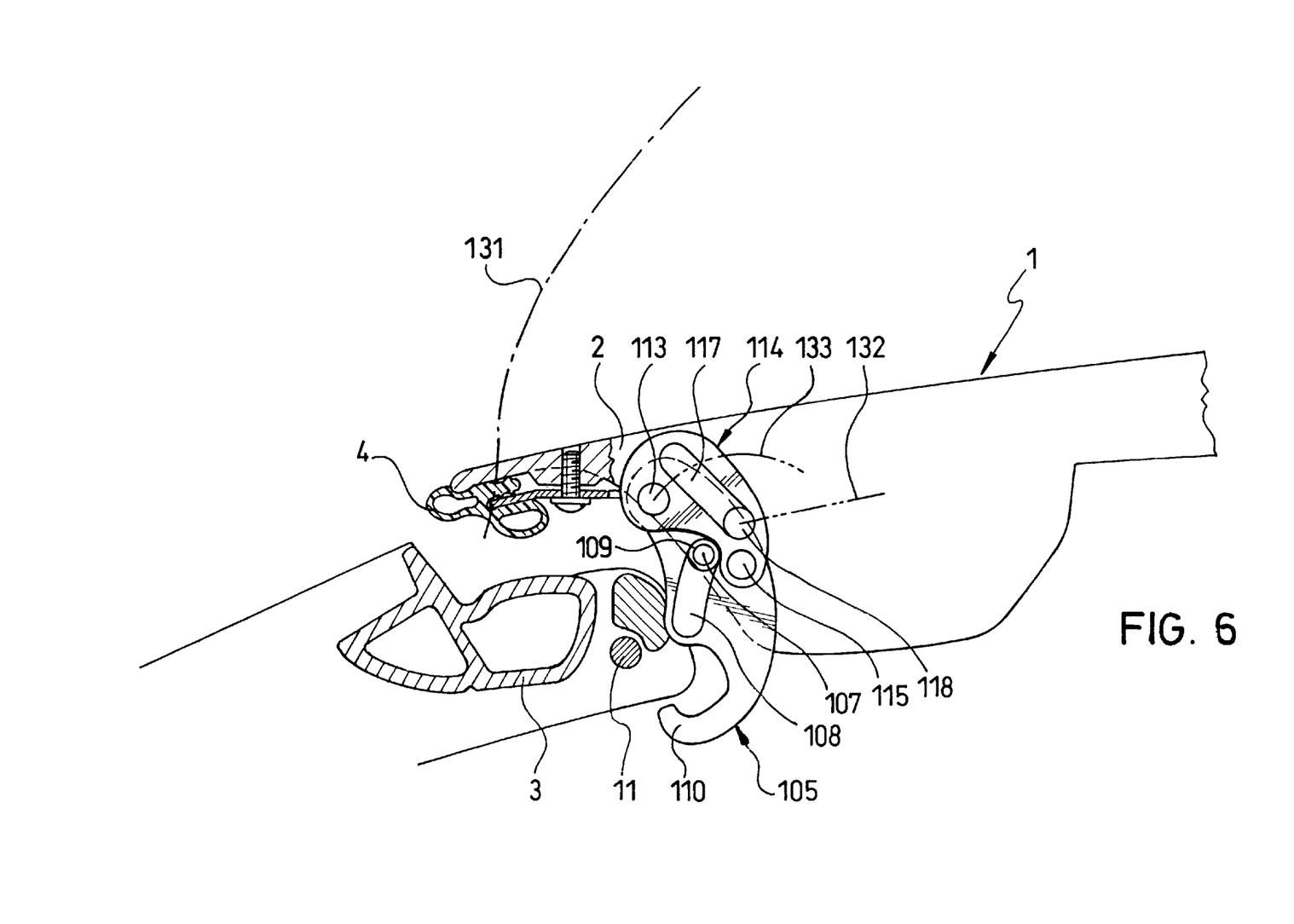
FIG. 6 is a schematic side view of a second embodiment of the latching device with the latching mechanism with the latch hook opened.
Figure 7:
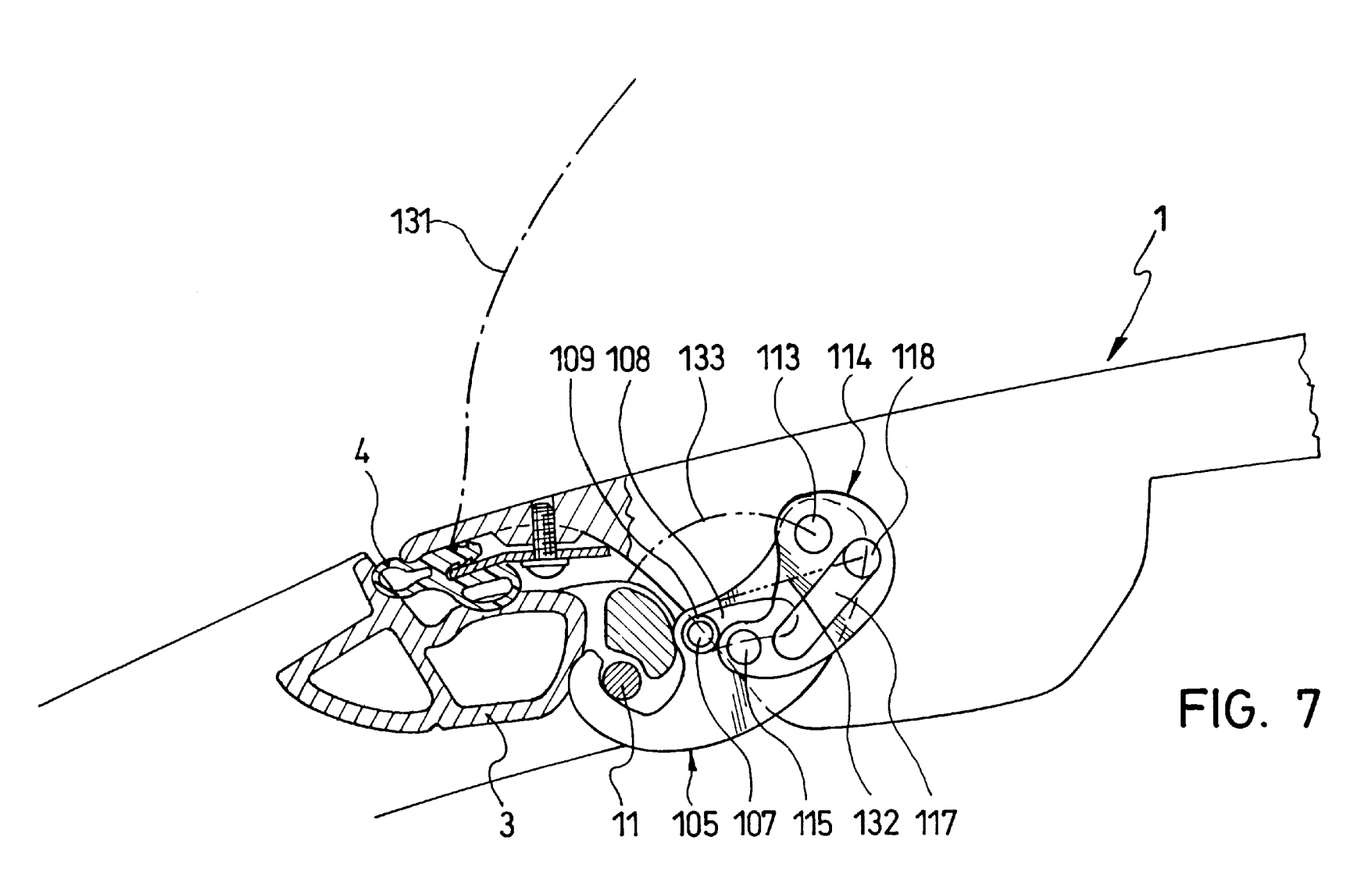
FIG. 7 is a schematic side view of the latching device of FIG. 6 with the latching mechanism when the latch hook is latched.

The guide profile 27 is located on the roof free end 2 at a small angle relative to the drive rod 20 in its operating position as shown in FIG. 5, which corresponds to the closed position of the latch hook 5 with the roof 1 closed. When the guide block 26 is pushed in the guide profile 27 out of the position shown in FIG. 5 on the end 25 of the guide 24 adjacent to the latch hook 5 in the direction to the opposite end 21 by the electric motor 30 with a constant speed, the drive rod 20, as a result of the described angular position, is pivoted around the guide pin 23 so that the journal 18 moves forward with increasing speed in the lengthwise or x-direction of the motor vehicle. The journal 18 moves on a straight path 32 (see FIGS. 1, 2, 3 and 5). Since the journal 18 is axially secured on the pivot lever 14, the drive rod 20 is axially entrained when it pivots. This balancing motion is enabled by the support of the guide pin 23 in the short elongated hole 22.

Figure 1:
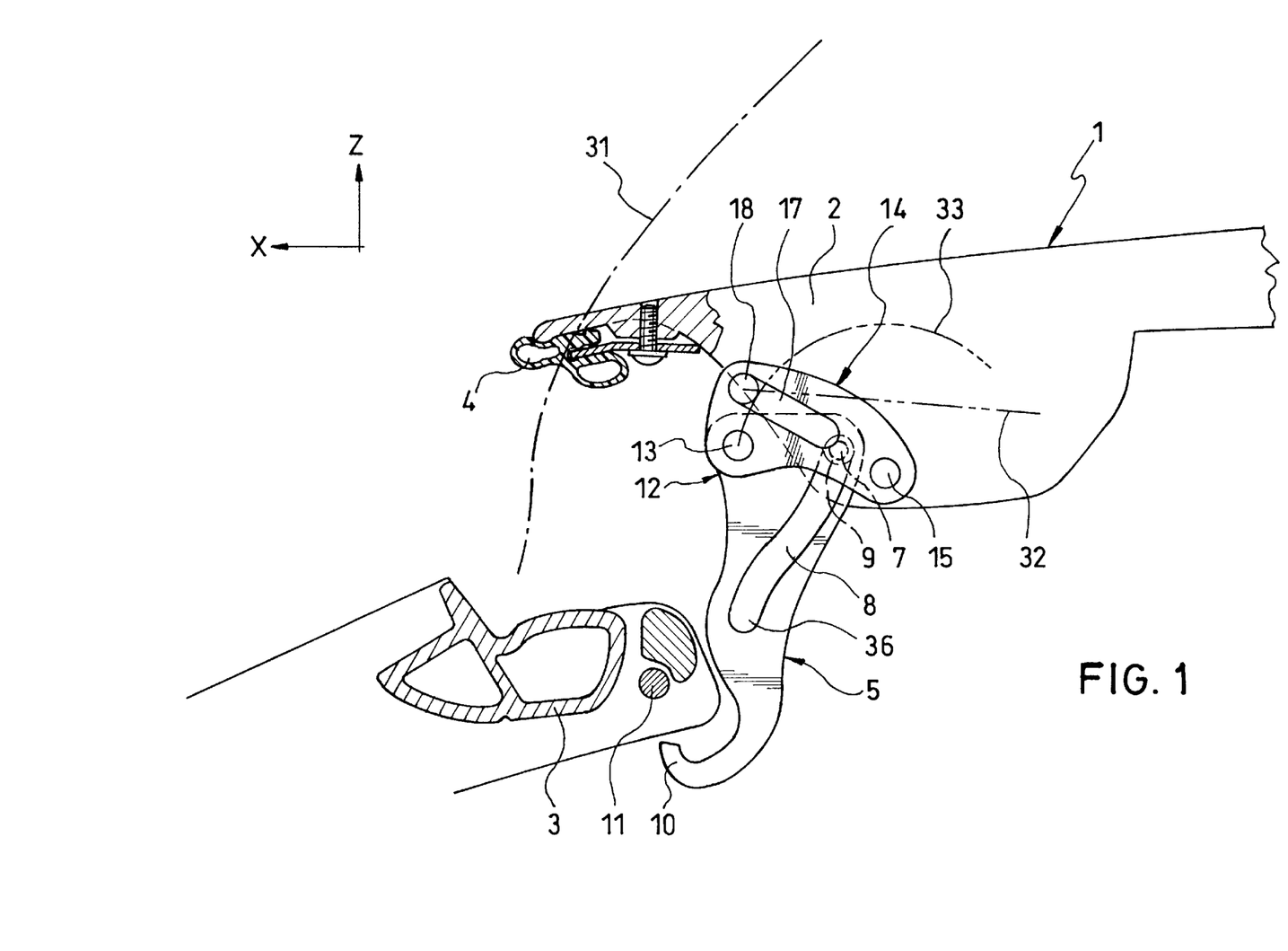
FIG. 1 is a schematic side view of a first embodiment of a latching device with an open latch hook and its latching mechanism on the free end of the folding roof of a convertible.
Figure 3:
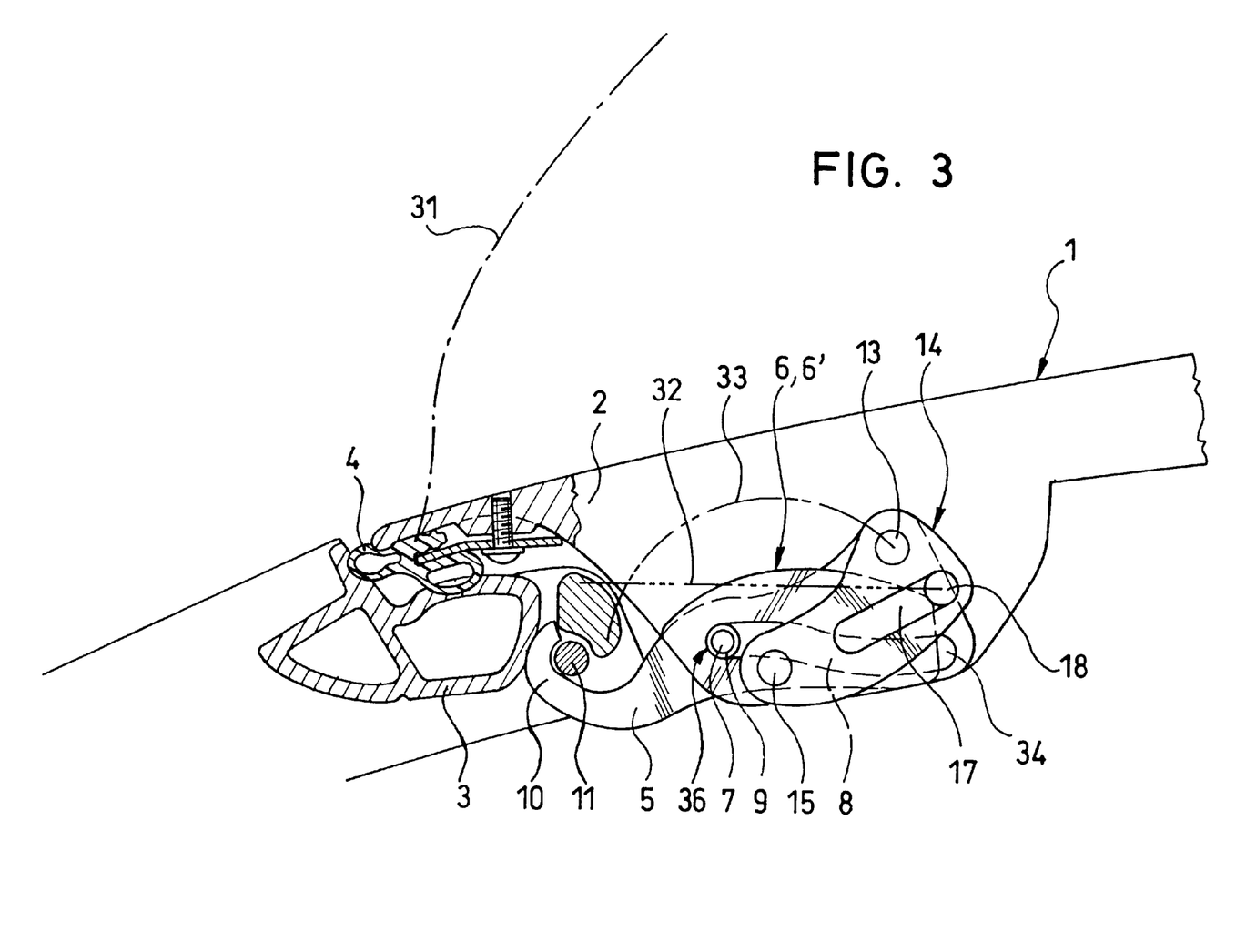
FIG. 3 is a schematic side view of the latch hook in its lock position on the apron with the folding roof closed.

To close and latch the folding roof 1, the roof is first moved by a roof drive (not shown) into the position shown in FIG. 1 in which the roof free end 2 is, for example, roughly 65 mm (in the vertical or z-direction) above the apron 3 and roughly 20 mm (in the x-direction) from the final closed position on the apron 3. The roof free end 2 moves along a path 31 which is shown in FIGS. 1 and 3. In the position of the latch mechanism 35 shown in FIG. 1, the journal 18 has been positioned by the drive means 16 into the front end position on its path 32. The journal 18 keeps the pivot lever 14 in the described pivot position which is directed forward from the bearing pin 15, and in which the pin 13 on its circular path 33 around the bearing pin 15 is in its front end position. The roller 9 or the pin 7 is located on the back end 34 of the guide 8 so that the opened latch hook 5 is pivoted into the illustrated, roughly vertical position which is open forward towards the apron 3.

Figure 2:
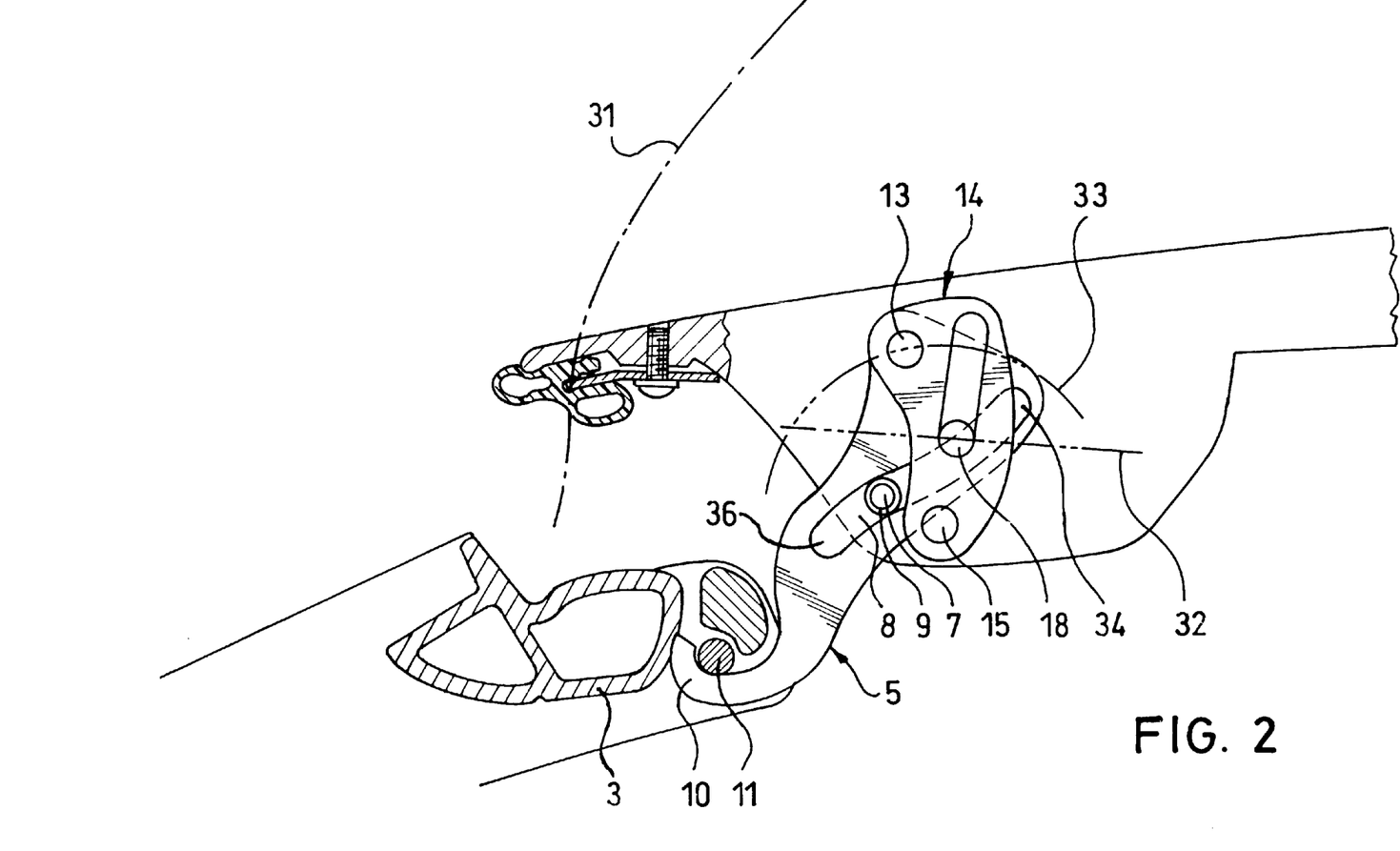
FIGS. 2 & 2a are schematic side views of the latch hook in the intermediate position, FIG. 2 showing an arrangement with the hook being carried by the cover and FIG. 2a showing the reverse arrangement with the hook being carried by the apron.
Figure 2A:
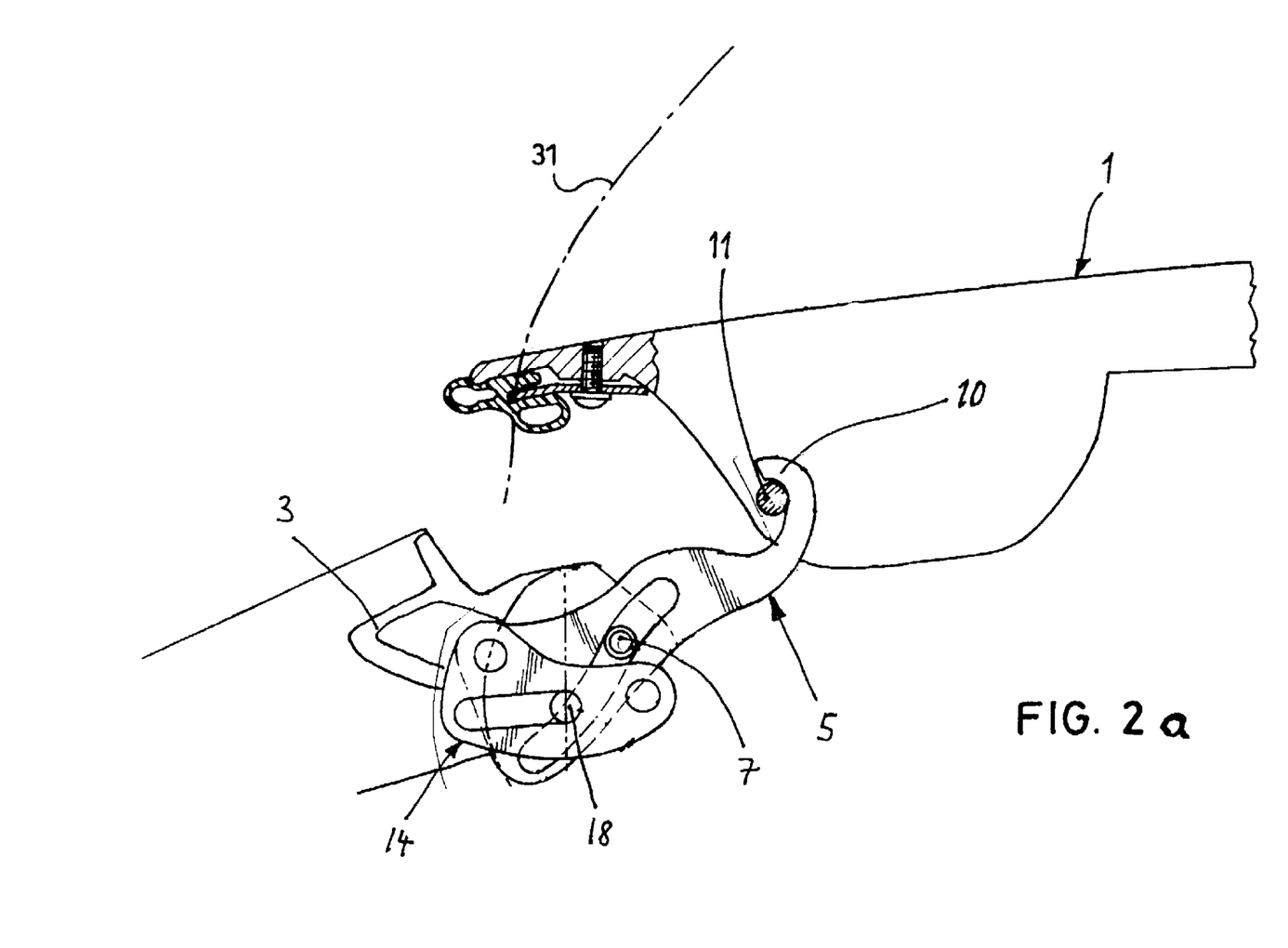

Then, if the journal 18 is moved backward by the drive rod 20 on its straight path 32 (see FIG. 2), it slides in the guide 17 of the pivot lever 14 and pivots the pivot lever 14 around the bearing pin 15 in doing so. The pin 13 moves on its circular path 33, and in doing so, pivots the latch hook 5 around the roof-mounted pin 7. Since the pin 13 moves away from the roof-mounted pin 7 during its motion along the circular path 33, at the same time, the latch hook 5 moves relative to the pin 7, the pin 7 and the roller 9 sliding in the guide 8 in the direction to the other end 36 of the guide, so that the latch hook 5 is guided in a pivoting and sliding motion which results from the increasing distance between the roller 9 and the pin 13. The dynamic behavior of the latch hook 5 is determined here by the behavior of the guide 8 in the latch hook 5 and its respective distance to the pin 13. As shown in FIG. 2, the latch hook 5 has surrounded the lock journal 11 on the apron 3, and by its upward motion relative to the roof free end 2, has pulled it down along the path 31 against the apron 3.

When the journal 18 is moved further by the drive means 16 on its straight path 32 into its back end position (see FIG. 3), it moves the pivot lever 14 by its engagement in the guide 17 into its rear pivot position. Via the pin 13, the latch hook 5 is pulled further to the rear and pushed relative to the roller 9 until the roller 9 adjoins the front end 36 of the guide. At the same time, the latch hook 5 is pivoted around the pin 7 so that the end 10 of the hook pulls the roof free end 2 forward in the x-direction and presses it down in the z-direction against the apron 3 into the closed position in which the latch hook 5 holds the folding roof or the roof free end 2 securely on the apron 3.

When the journal 18 is driven out of the position shown in FIG. 3 in the opposite direction, in the opposite sequence of motions, the latching of the latch hook 5 is canceled and the roof free end 2 is released so that the folding roof 1 can be opened.

In the described sequence of motions, the electric motor 30, via the raising cable 28, drives the guide block 26 at a constant speed between its two end positions. The drive means 16 and the latching mechanism 35 convert this uniform driving motion of the guide block 26 into a delayed speed of the journal 18 along its linear path 32 from the opened position, as shown in FIG. 1, into the latched position as shown in FIG. 3, or into accelerated motion in the opposite direction. This variation of the speed of the journal 18 along its path 32 is superimposed by the journal 18 on its straight path 32 moving past the bearing pin 15 at a distance, the journal 18 moving in the guide of the pivot lever 14 from a more distant end position which is external relative to the bearing pin 15 to an inner adjacent end position and back again to the outer end position, and by the journal 18 producing a varying pivoting speed of the pivot lever 14 by the varying distance relative to the bearing pin 15. In doing so, in the middle pivot position (see FIG. 2), the pivoting speed of the pivot lever 14, and thus of the pin 13, is greater than in the two end-side positions of the journal 18. These different pivoting speeds are converted via the changing distance between the pin 13 and the roller 9 or the pin 7 which form the two bearing sites of the latch hook 5, and the change of their mutual position is converted into the described pivoting and sliding motion of the latch hook 5.

Thus, the latch hook 5 on the last section of its motion moves when closing and latching the folding roof 1 (from FIG. 2 to FIG. 3) as a result of the described dynamic behavior of the journal 18 and the pivot lever 14 with a clearly reduced speed. Furthermore, the closing force of the latch hook 5 in the last segment of its motion, in which the seal 4 on the roof free end 2 is pressed against the apron 3, is intensified by the larger lever arm of the application of the closing force as a result of the increased distance between the pin 13 and the roller 9.

The layout of the guide 8 with one or more differently curved sections makes it possible to set the sequence of motions for a desired dynamic behavior of the latch hook 5, as is apparent from the figures.

A second embodiment of the latch hook is shown in FIGS. 6 to 10. This latching device has a structure similar to the embodiment described first. Therefore, identical or similar parts are labeled with the reference number of the first embodiment and other comparable parts with reference numbers increased by 100.

Figure 8:
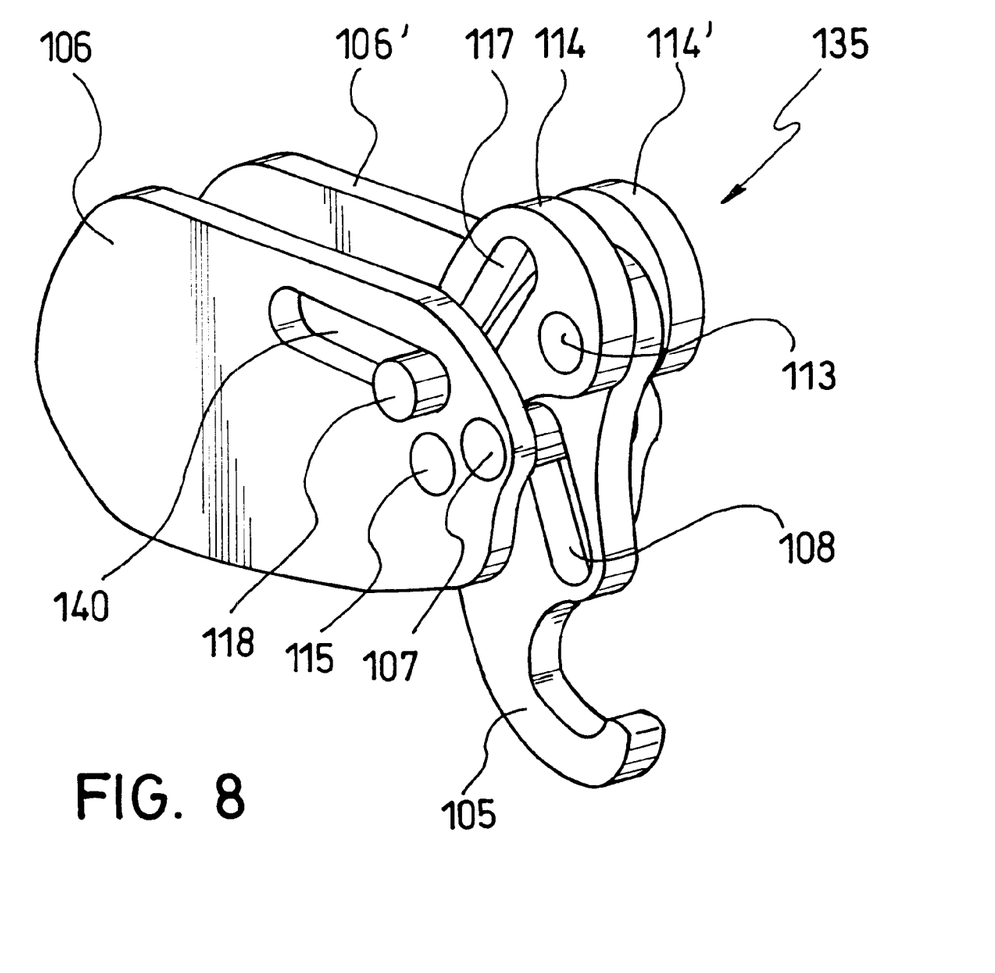
FIG. 8 is a perspective view of the latching mechanism of FIG. 6.
Figure 9:
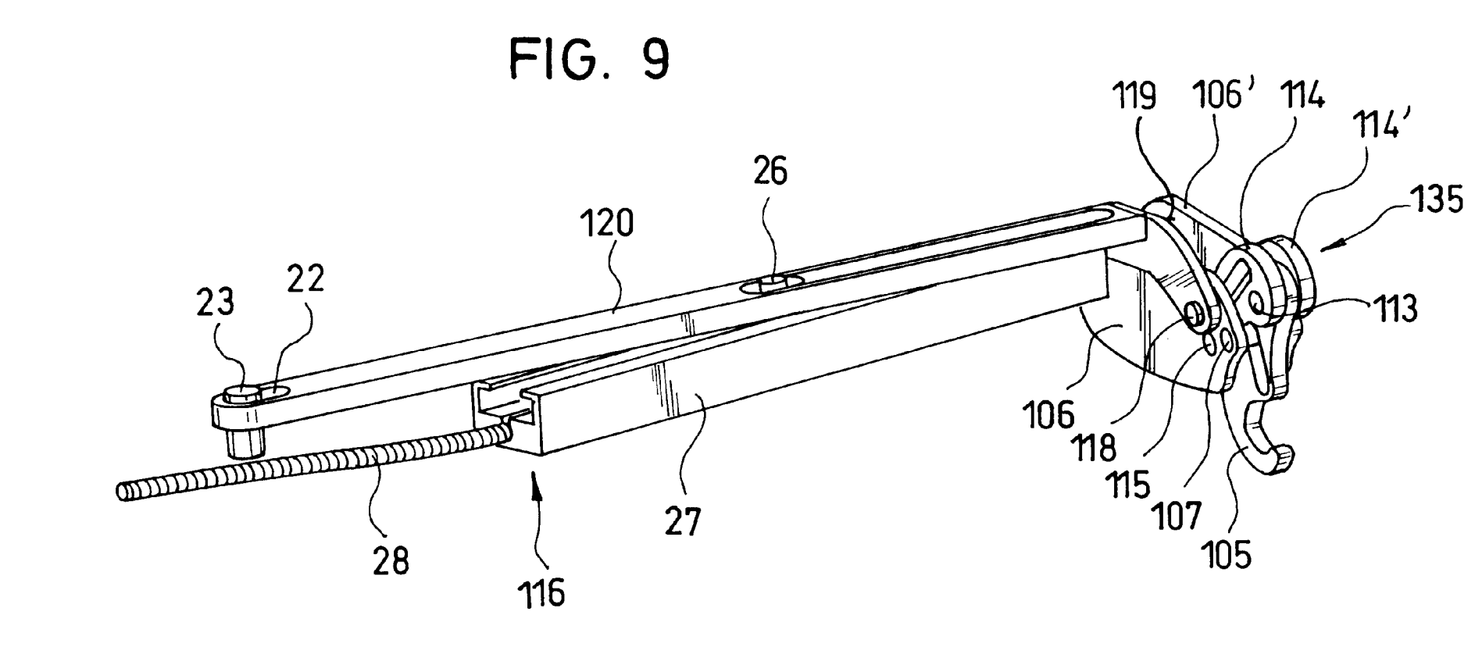
FIG. 9 is a perspective view of the latch hook with its latching mechanism and a drive means.
Figure 10:
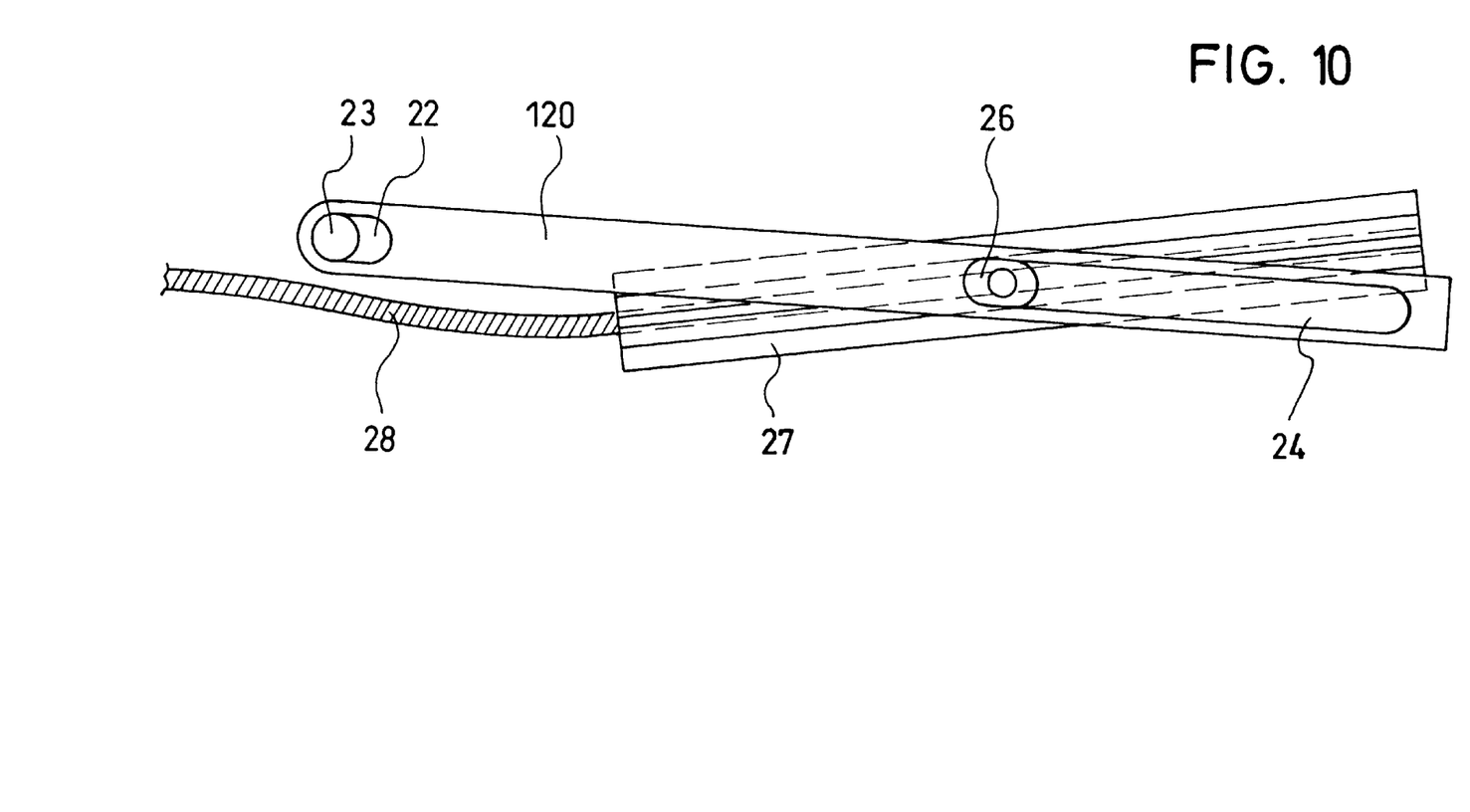
FIG. 10 is a top view of the drive means.

The latch hook 105 is located between two parallel pivot levers 114, 114' which constitute intermediate elements and are spaced apart from one another (see FIG. 8). A pin 113 is a coupling element that connects the two pivot levers 114, 114' securely to one another and extends through a hole in the latch hook 105. On either side next to the respective outer sides of the pivot levers 114, 114', there is a holding plate 114' which is attached to the roof free end 2 and on which one of the pivot levers 114 and 114' is pivotally mounted via a respective bearing pin 115. In addition, the two holding plates 106, 106' are securely joined to one another via the pin 107 which constitutes a guide part or element. The pin 107 extends through the guideway 108 of the latch hook 105, which is formed as an elongated recess in the latch hook 105. On the pin 107, a roller 109 can be supported and held in the guideway 108 such that the latch hook 105 can be moved over the length of the guideway 108 relative to the roller 109 or the pin 107 and can be pivoted relative to the pin 107. The latch hook 105 has a front hook-shaped end 110 for fitting around the lock journal 11 of the apron 3.

The inner pivot lever 114 which is adjacent to the drive means 116 contains a guide 117 into which the journal 118 of the drive means 116, which is formed according to the first embodiment, fits. The journal 118 projects on the outside end face 119 of the drive rod 120 of the drive means 116. As an alternative to a motorized drive, the drive means 116 can have a manual actuation means such as, for example, a central turning handle by which, via the raising cable 28, the guide block 26, which is movably supported in the upwardly open guide profile 27, can be moved between its two end positions.

In the open position of the latching device (see FIG. 6), the journal 118 is located in the guide 117 in the end position adjacent to the bearing pin 115. When the journal 118 moves to the rear on its straight path 132, the pivoting speed of the pivot lever 114 continuously decreases as a result of the initial proximity of the journal 118 to the bearing pin 115 and the increasingly growing distance. In this way the pivoting speed of the latch hook 105 is slowed towards the closed position. When the pivot lever 114 is pivoted, the pin 113, which is guided on the circular path 133, moves away from the roof-mounted pin 107 which is held in the guide 108 of the latch hook 105, and in doing so, pulls the latch hook 105 on the roof free end 2 to the rear until the pin 107 in the guide 108 assumes its front end position. The increasing distance from the pin 113 to the pin 107 causes, as a larger lever arm, an increase of the latching force for the slowed closing motion.

Figure 11:
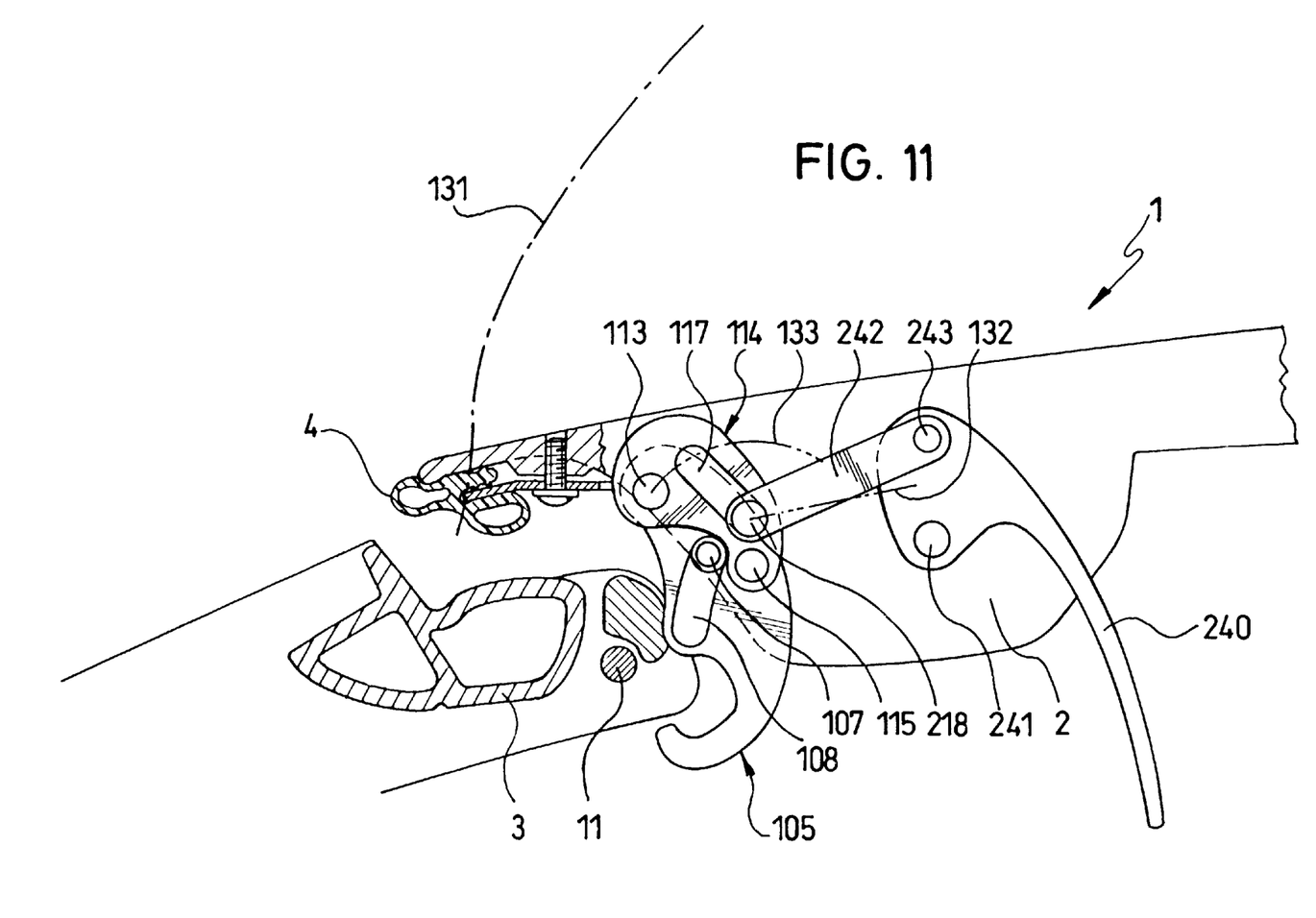
FIG. 11 is a schematic side view of a third embodiment of a latching mechanism with the latch hook open and with an manual actuation handle.
Figure 12:
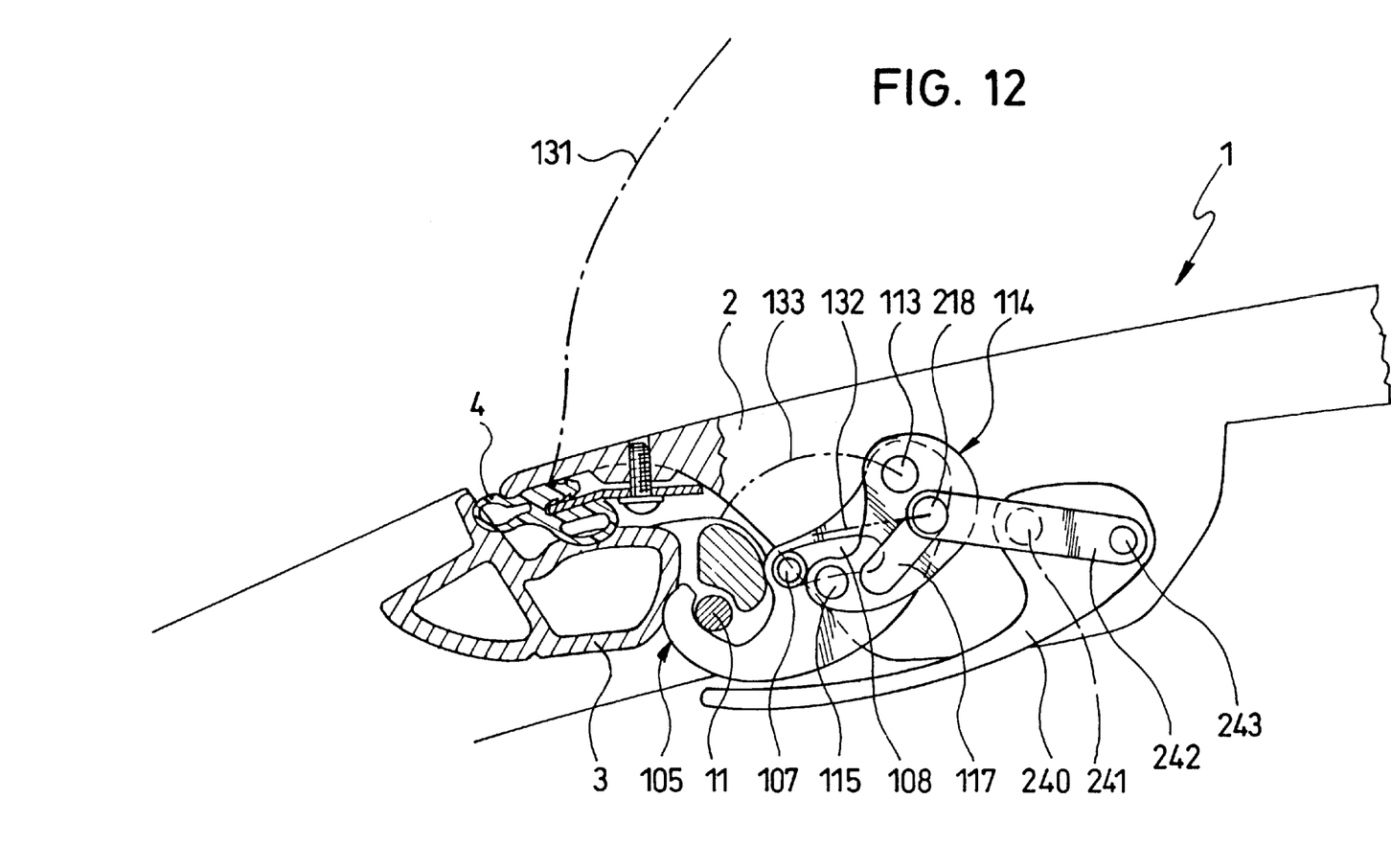
FIG. 12 is a schematic side view of the latch hook in its latched closed position.

The latching device shown as the third embodiment in FIGS. 11 & 12 contains the latching mechanism 35 described in the second embodiment, but instead of the drive means with a central motorized or manual actuation, a handle 240 is assigned to each of the two latching mechanisms 35. The handle 240 is supported to be able to pivot on the roof free end 2 by means of a bearing pin 241. Two drive rods 242 which are located next to one another are, on the one hand, coupled by a pin 243 to pivot relative to the handle, and on the other hand, they reach over the respective journal 218 into the guides 117 which are made in this embodiment in the two pivot levers 114. By pivoting the handle 240 out of its back end position (FIG. 11) into the front end position (FIG. 12) according to the already described dynamic behavior of the latching mechanism 35, the latch hook 105 is pushed and pivoted into its lock position. A detent pawl (not shown) can latch the handle 240 in the front end position in which it is located, for example, at dead center.

If the handle 240 is actuated with a constant pivoting speed, the speed of the journal 218 is continuously reduced during closing. At the same time, the latching mechanism 35 according to the aforementioned description additionally reduces the latching speed of the latch hook 105. Thus, the high closing forces in the area of the latching position are converted by the large actuation path of the handle into small hand actuation forces.

What is claimed is:

1. Latching device for a folding roof of a motor vehicle, comprising:

a latch hook which is movably supported on a free end of a folding roof;

a drive means for placing the latch hook in locking engagement on a front windshield apron of a motor vehicle; and a guide part on the free end of the folding roof and guideway on the latch hook in which the guide part engages for controlling movement of the latch hook, wherein, for closing and latching the folding top, the latch hook is displaceable in a compound, pivoting and sliding motion relative to the roof free end by displacement of the guide part along the guideway as the latch hook is pivoted around the guide part.

2. Latching device as claimed in claim 1, wherein the drive means drivingly engages an intermediate element which is coupled to the latch hook for moving the latch hook to close and latch the folding roof in said pivoting and sliding motion relative to the guide part, said guide part engaging the guideway of the latch hook and pivoting around the guide part.

3. Latching device as claimed in claim 2, wherein said intermediate element is a pivot lever.

4. Latching device as claimed in claim 1, wherein the latch hook is coupled to the drive means via a latching mechanism which has a pivot lever which is pivotally mounted on one of the roof free end and the apron and which is connected to the latch hook via a coupling element which is spaced apart from the guideway; and wherein the latching mechanism is operative to slow the movement of the latch hook in a last section of movement before latching with a drive force that is increased relative to that being applied prior to said last section of movement.

5. Latching device as claimed in claim 4, wherein the coupling element is guided by the pivot lever on a curved path.

6. Latching device as claimed in claim 4, wherein the guideway in the latch hook has at least one nonlinear path section.

7. Latching device as claimed in claim 1, wherein the drive means comprises an electric motor which drives a raising cable which is connected to a guide block via a pinion.

8. Latching device as claimed in claim 1, wherein the drive means has a pivoting handle for each latching mechanism which is coupled to a journal in a drive connection.

9. Latching device as claimed in claim 2, wherein the latch hook is movably supported in a symmetrical arrangement between two holding plates and two pivot levers.

10. Latching device for latching a folding roof of a motor vehicle on an windshield apron, comprising:

a movably supported latch hook having a guideway;

a counterpiece which is engageable by the latch hook; and a drive means for moving the latch hook into lock engagement on the counterpiece;

wherein the latch hook is movably supported on one of a free end of the roof and the windshield apron and the counterpiece being located on the other of the apron and the roof free end; and wherein the drive means drivingly engages an intermediate element which is coupled to the latch hook for moving the latch hook to close and latch the folding roof in a pivoting and sliding motion relative to a guide part, said intermediate part being engaged in the guideway of the latch hook and being pivotable around the guide part.

11. Latching device as claimed in claim 10, wherein said intermediate element is a pivot lever.

12. Latching device as claimed in claim 10, wherein the latch hook is coupled to the drive means via a latching mechanism which has a pivot lever which is pivotally mounted on one of the roof free end and the apron and which is connected to the latch hook via a coupling element which is spaced apart from the guideway; and wherein the latching mechanism is operative to slow the movement of the latch hook in a last section of movement before latching with a drive force that is increased relative to that being applied prior to said last section of movement.

13. Latching device as claimed in claim 12, wherein the coupling element is guided by the pivot lever on a curved path.

14. Latching device as claimed in claim 13, wherein the drive means has a drive journal which is coupled to the pivot lever and drives it in two opposite directions for latching and unlatching, the drive journal being movable on an essentially linear path past a pivoting axis of the pivot lever and being movably held in a guideway of the pivot lever to equalize a changing distance relative to the pivot axle.

15. Latching device as claimed in claim 14, wherein the drive journal is moved slowly by the drive means for producing the latching position of the latch hook.

16. Latching device as claimed in claim 12, wherein the drive means contains a drive rod which is located on one of the free end of the roof and the windshield apron in a transverse direction and has a drive journal on an outer end which fits into the latching mechanism and is pivotally mounted on an opposite inner end so that the drive journal is guided on a roughly linear path of motion when the drive rod is pivoted, and has a guide element which intersects the drive rod at an acute angle and which is securely mounted on said one of the roof free end and the apron in the transverse direction and on which there is movably supported a driven guide block which slidingly fits into a lengthwise guide of the drive rod at an intersection point and by lengthwise displacement on the guide element pivots the drive rod with the drive journal.

17. Latching device as claimed in claim 16, wherein the guide block is driven with a roughly constant speed and accelerates or slows down the journal depending on its direction of motion.

18. Latching device as claimed in claim 17, wherein the guideway in the latch hook has at least one nonlinear path section.

19. Latching device as claimed in claim 16, wherein the drive means comprises an electric motor which drives a raising cable which is connected to the guide block via a pinion.

20. Latching device as claimed in claim 16, wherein the drive means is a pivotally mounted handle which, to move the guide block, is connected to the guide block via a raising cable.

21. Latching device as claimed in claim 16, wherein the drive means has a pivoting handle for each latching mechanism which is coupled to the journal in a drive connection.

22. Latching device as claimed in claim 16, wherein the latch hook is movably supported in a symmetrical arrangement between two holding plates and two pivot levers.

* * * * *